United States Patent

Heymer et al.

[15] 3,645,674

[45] Feb. 29, 1972

[54] PROCESS FOR THE MANUFACTURE OF AMMONIUM POLYPHOSPHATE

[72] Inventors: Gero Heymer, Knapsack near Cologne; Heinz Harnisch, Lovenich near Cologne, both of Germany

[73] Assignee: Knapsack Aktiengesellschaft, Knapsack near Cologne, Germany

[22] Filed: May 5, 1969

[21] Appl. No.: 821,967

[30] Foreign Application Priority Data

May 31, 1968 Germany......................P 17 67 655.0

[52] U.S. Cl..................................................23/106, 71/34
[51] Int. Cl......................................C01b 25/28, C05b 7/00
[58] Field of Search..........................23/106, 107; 71/34, 43

[56] References Cited

UNITED STATES PATENTS

| | | | |
|---|---|---|---|
| 3,495,937 | 2/1970 | Shen et al. | 23/106 A |
| 3,241,946 | 3/1966 | Young | 71/43 |
| 3,342,579 | 9/1967 | Frazier | 23/107 X |
| 3,382,059 | 5/1968 | Getsinger | 23/106 X |
| 3,397,035 | 8/1968 | Shen et al. | 23/106 |
| 3,464,808 | 9/1969 | Kearns | 23/106 X |
| 3,492,087 | 1/1970 | MacGregor et al. | 23/106 |

*Primary Examiner*—Oscar R. Vertiz
*Assistant Examiner*—Charles B. Rodman
*Attorney*—Connolly and Hutz

[57] ABSTRACT

Production of chain ammonium polyphosphates of the general formula $(NH_4)_{n+2}P_nO_{3n+1}$ by the reaction of a polyphosphoric acid with gaseous ammonia. Ammonium polyphosphates with a chain length $n$ longer than that of the feed polyphosphoric acid are produced by heating a polyphosphoric acid with a $P_2O_5$-content higher than 76 weight percent to a temperature between 80° and 100° C.; introducing gaseous ammonia thereinto while arresting the supply of further heat; allowing the temperature in the reaction mixture to increase under the action of the heat of neutralization set free; maintaining the reaction mixture, if necessary by cooling, between 300° and 330° C. until the temperature itself commences to fall below 300° C; allowing the reaction mixture to stand at temperatures between 230° and 270° C., which are maintained, if necessary by supplying further heat, until formation of a viscous crystalline magma which practically ceases to absorb further ammonia; cooling the reaction product, washing it and drying it at temperatures lower than 100° C.

6 Claims, No Drawings

PROCESS FOR THE MANUFACTURE OF AMMONIUM POLYPHOSPHATE

The present invention relates to a process for the manufacture of chain ammonium polyphosphates of the general formula $(NH_4)_{n+2}P_nO_{3n+1}$, by the reaction of a polyphosphoric acid with gaseous ammonia. More particularly, the invention relates to the production of ammonium polyphosphates of the type described above and of low bulk density.

It has long been known that ammonium polyphosphates—which are briefly termed APP hereinafter—can be produced by simple neutralization of a polyphosphoric acid by means of gaseous ammonia. While this process has already been tried commercially, the fact remains that only short chain products are obtained, which have a chain length $n$ between 2 and 6, are very hygroscopic and very water soluble. They are chiefly used in agriculture and forestry.

The simple neutralization of a polyphosphoric acid by means of gaseous ammonia can, however, not be used for making APP with a mean chain length $n$ substantially longer than 4, for example between 20 and 400, bearing in mind that the most highly concentrated phosphoric acids which are commercially available have a mean chain length $n$ of about 4. Condensed phosphates are normally produced commercially by subjecting suitable orthophosphates to thermal dehydration with condensation into longer chains. This process is not applicable to ammonium polyphosphates since ammonia is eliminated together with water.

Attempts have therefore been made to produce medium and long chain APP by processes, wherein the water of constitution is eliminated by chemical reaction, for example with urea or phosphorus pentoxide, rather than by thermal dehydration at high temperatures. This results in additional expense as far as alkali metal polyphosphates are concerned bearing in mind that the condensing agents are either relatively costly or react with the water split off, while forming undesirable byproducts.

It has now unexpectedly been found that APP with a chain length longer than that of the feed polyphosphoric acid can be produced by subjecting a short chain polyphosphoric acid to neutralization by means of gaseous ammonia. To this end, it is necessary to use a polyphosphoric acid with a $P_2O_5$-content higher than 76 weight percent, preferably between 82 and 86 weight percent, to heat the acid to temperatures between 80° and 100° C., and then to introduce gaseous ammonia thereinto without the supply of further heat. The neutralization heat set free produces a temperature increase in the reaction mixture, which is maintained, if necessary by cooling, between 300° C., preferably between 310° and 320° C., until the temperature itself commences to fall below 300° C. As soon as this has occurred, the reaction mixture is allowed to stand at temperatures between 230° and 270° C., preferably between 245° and 255° C., which are maintained by supplying further heat, if necessary, until formation of a viscous crystalline magma, which practically ceases to absorb further ammonia. The reaction product is subsequently cooled, washed with cold water and dried at temperatures lower than 100° C.

When it is desired to produce APP with a mean chain length $n$ between 20 and 90, then the isolated reaction product is annealed for a period of at least 15 minutes, at 100° to 320° C. in an ammonia atmosphere having between 1 and 5 percent by volume steam therein.

Products with a mean chain length $n$ between 100 and 400 are obtained by annealing the isolated reaction product for a period of at least 15 minutes, at temperatures between 220° and 320° C. in a pure ammonia atmosphere.

The customary neutralization of polyphosphoric acids by means of $NH_3$ predominantly produces glassy, hygroscopic, short chain APP. As opposed thereto, it can readily be observed in the process of the present invention that white crystals of long chain APP, which is nonhygroscopic and scarcely soluble in cold water, commence gradually to separate from the short chain APP-melt. The minor solubility in water makes it possible for the cooled, long chain product to be readily separated from the solidified, water-soluble melt balance portion, by simple extraction using cold water. A purely white, loose APP-powder with a mean chain length between about 80 and 100 is obtained, which has an unexpectedly low bulk density between about 0.3 and 0.5 kg./liter, as opposed to that of material produced by different methods. The reason for this presumably resides in the formation of loose, rather incompact crystals with a large surface area from the melt, during the undisturbed crystallization. This low bulk density is highly desirable for quite a number of uses.

The periods during which the reaction in the individual temperature ranges is carried out are a function firstly of the polyphosphoric acid and ammonia quantities used and secondly of the dimensions of the apparatus, heat transfer and analogous factors, but remain constant in a given apparatus. In any case, the low bulk density is retained even for the annealed, isolated reaction product. The solubility of APP decreases as the chain length increases; the two magnitudes are substantially inversely proportional to one another. APP with a chain length $n=20$ is almost completely soluble in cold water, whereas APP with a chain length $n=400$ contains at most 2 percent soluble component. The type of post-treatment and the establishment of the mean chain length are sometimes of interest in view of solubility of APP which is important for various uses.

The following Examples illustrate the process of the present invention.

EXAMPLE 1

5.035 kg. polyphosphoric acid (84 weight percent $P_2O_5$) were heated to 90° C. in a stainless steel vessel (V4A-steel). Gaseous ammonia (1.5 normal cubic meter/hr) (measured at N.T.P.) were introduced thereinto. Once the inside temperature was 250° C., the apparatus was gradually cooled from the outside to dissipate excessive heat of neutralization and to maintain the reaction mixture at a temperature between 300° and 330° C., preferably between 310° and 320° C. Within 30 minutes, the primary P—OH groups were found to have been extensively neutralized. The melt then ceased to absorb all of the ammonia supplied and the temperature commenced to drop. The cooling was arrested and the quantity of feed ammonia was reduced down to 0.4 normal cubic meter per hour. The temperature was allowed to drop down to 245° C. and maintained at that level using a heater. Within 1 hour, long chain APP commenced to crystallize out from the melt in a quantity sufficient to produce a crystalline magma so viscous that is was necessary to use a pressure of 1 atmosphere gauge to force ammonia therethrough, which was practically no longer absorbed by the melt. The experiment was arrested and the crystalline magma was quenched on a water-cooled metal plate. The quenched material was extracted using a little cold water and minor amounts of short chain APP, which was in the form of a solidified, glassy melt, were removed. The residue was dried at 70° C. in a vacuum drying cabinet. There were obtained 5.28 kg. of a white, X-ray crystalline and loose powder which had a bulk density of 0.39 kg./liter, a $P_2O_5$-content of 72.8 percent and a mean chain length $n=110$. The $P_2O_5$-yield in the final product accordingly was 91 percent.

EXAMPLE 2

Fifty kg. of a product prepared in the manner described in Example 1 were passed at a rate of 30 kg./hr., in an ammonia atmosphere through a rotary tube heated to 310° C. The residence time of the material in the rotary tube was about 50 minutes. After cooling, the chain length was determined. The mean chain length $n$ was found to have increased from 110 to 350. A further 40 kg. of a product prepared in the manner described in Example 1 were passed through the same rotary tube, again at a rate of 30 kg./hr., but at a temperature of 200° C. under an atmosphere of 95 percent by volume ammonia and 5 percent by volume steam. The mean chain length $n$ was found to have been reduced to 23.

We claim:

1. A process for the manufacture of crystalline, water insoluble chain ammonium polyphosphates of the general formula $(NH_4)_{n+2}P_nO_{3n+1}$ by the reaction of a polyphosphoric acid having a $P_2O_5$-content higher than 76 weight percent with gaseous ammonia, at about atmospheric pressure and at temperatures above 300° C. which comprises producing ammonium polyphosphates with a chain length $n$ greater than 4 longer than that of the feed polyphosphoric acid by the steps comprising heating the polyphosphoric acid to a temperature between 80° and 100° C.; introducing gaseous ammonia thereinto without supplying further heat; allowing the temperature in the reaction mixture to increase under the action of the heat of neutralization set free; maintaining the reaction mixture, if necessary by cooling, between 300° and 330° C., until the temperature itself commences to fall below 300° C.; allowing the reaction mixture to stand at temperatures between 230° and 270° C. which are maintained, if necessary by supplying further heat, until formation of a viscous crystalline magma which practically ceases to absorb further ammonia; cooling the resulting reaction product, washing it with cold water and drying it at temperatures lower than 100° C.

2. The process of claim 1, wherein ammonium polyphosphates with a mean chain length $n$ between 20 and 90 are produced by annealing the isolated reaction product for a period of at least 15 minutes, at a temperature between 100° and 320° C. in an atmosphere of ammonia having between 1 and 5 percent by volume steam therein.

3. The process of claim 1, wherein ammonium polyphosphates with a mean length $n$ between 100 and 400 are produced by annealing the isolated reaction product for a period of at least 15 minutes, at temperatures between 220° and 320° C. in an ammonia atmosphere.

4. The process of claim 1, wherein the polyphosphoric acid has a $P_2O_5$-content between 82 and 86 weight percent.

5. The process of claim 1, wherein the reaction mixture is maintained at a temperature between 310° and 320° C. by cooling it while the ammonia is introduced thereinto.

6. The process of claim 1, wherein, once the temperature has dropped down to 300° C., the reaction mixture is maintained at a temperature between 245° and 255° C. until formation of a crystalline magma.

* * * * *